United States Patent Office 3,127,775
Patented Apr. 7, 1964

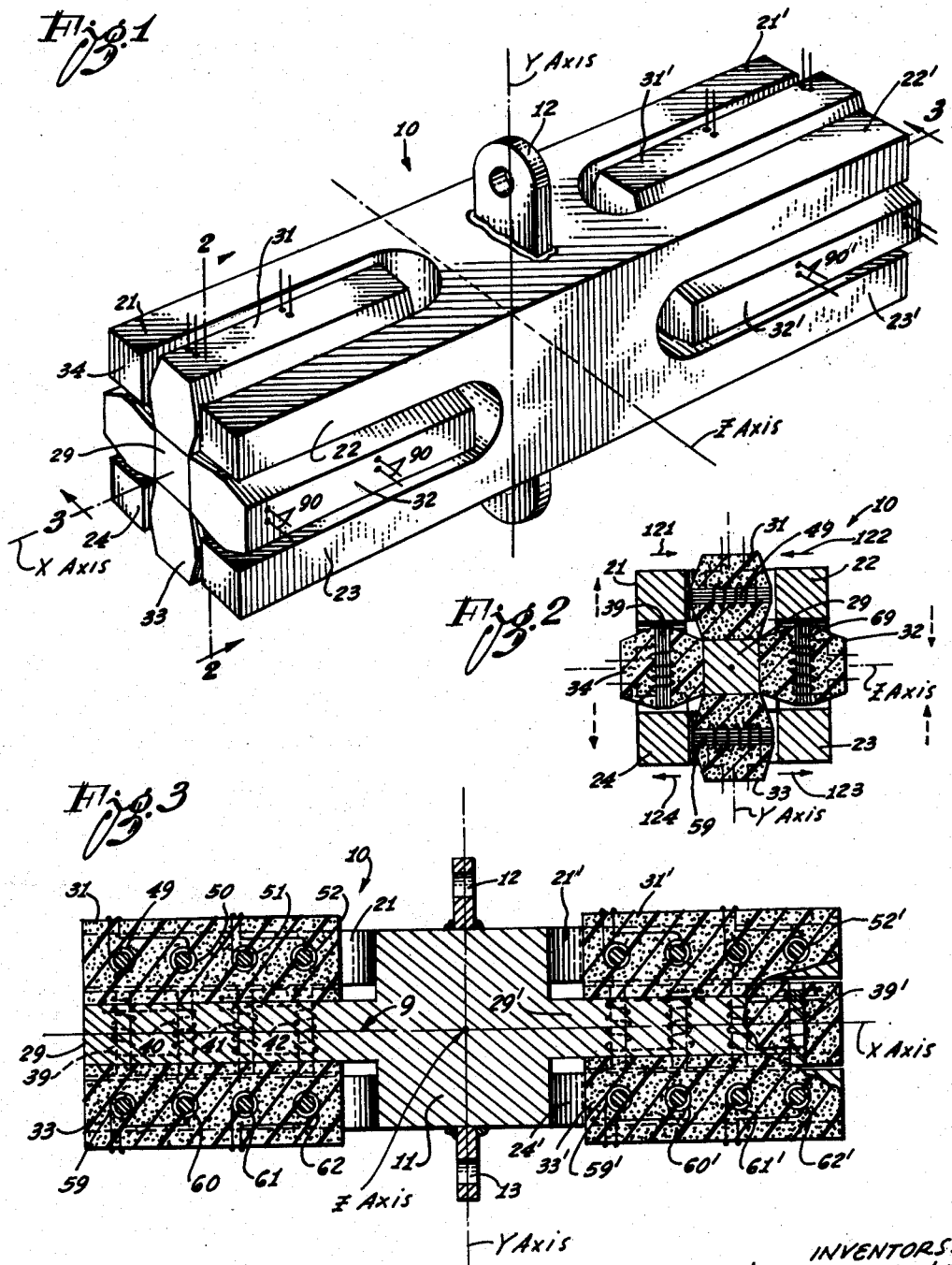

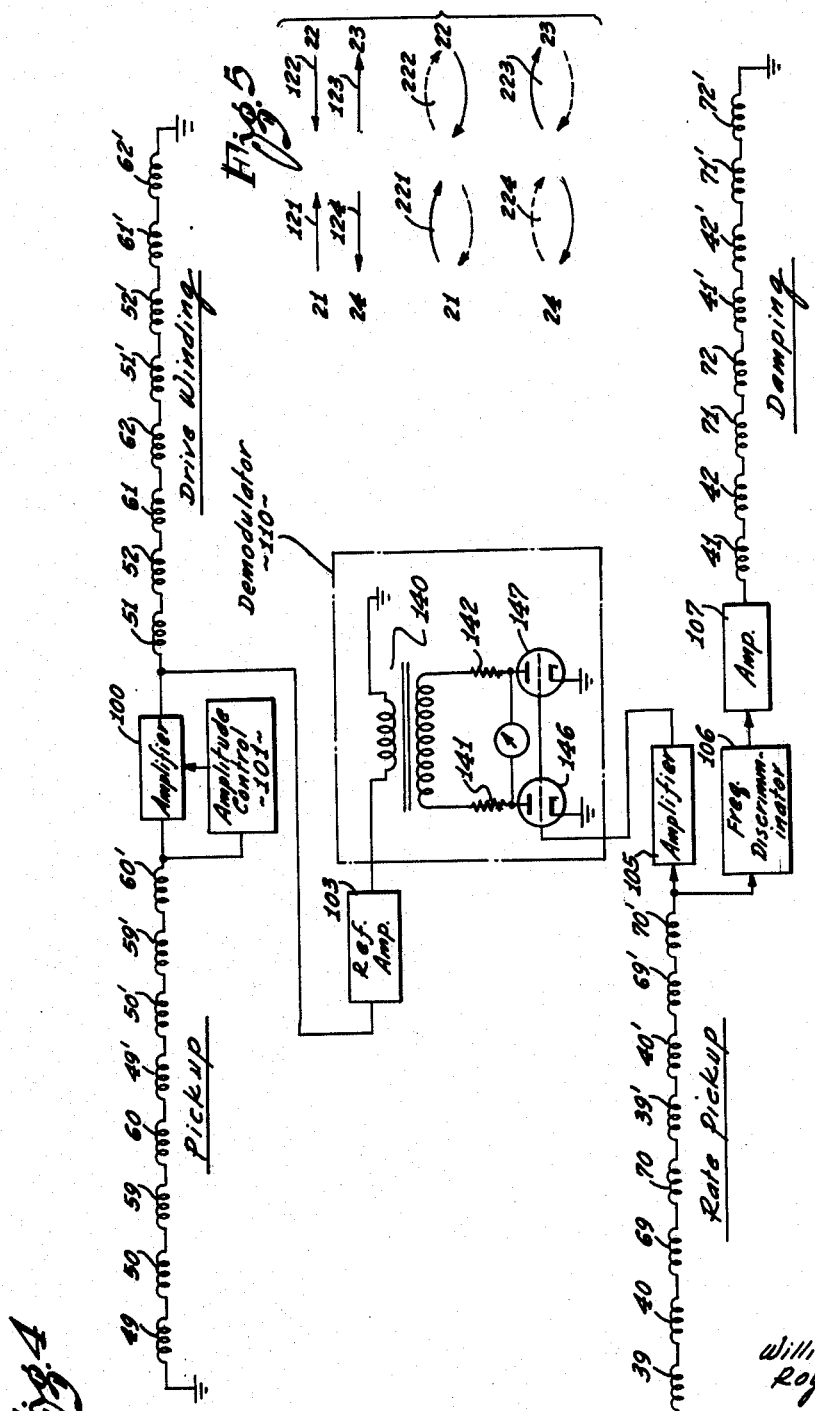

3,127,775
VIBRATORY RATE GYROSCOPE
Roy A. Hansen, Los Angeles, and William J. Holt, Jr., Pacific Palisades, Calif., assignors to The Gyrex Corporation, Santa Monica, Calif., a corporation of California
Filed Oct. 28, 1960, Ser. No. 65,784
18 Claims. (Cl. 73—505)

This invention relates to apparatus for sensing and measuring rate of turn and, more particularly, to vibratory rate gyroscopes.

Heretofore, rate of turn has been measured by rotating-mass types of rate gyroscopes. Such gyroscopes consist essentially of a wheel rotating at high speed in gimbals. Although instruments of this type are generally satisfactory, they are subject to several well known limitations. For example, high speed, delicate bearings are required. Even with such bearings, frictional problems with the resultant drift due to the rotating wheel and gimbals are present. Further limitations are due to difficulties of measuring accurate dynamic balance of the wheel about its axis of rotation. In general, such instruments are expensive and delicate and, further, are relatively complicated and require a high degree of skill and dexterity in the operation and maintenance.

A vibratory type of rate gyroscope, which, as its name implies, uses vibrating rather than rotating masses, has been proposed for the measurement of inertial angular velocity. This latter type of instrument is not subject to some of the drawbacks encountered in the rotating mass type of rate gyroscope discussed above. However, a major difficulty encountered in prior art vibratory types of rate gyroscopes is the fact that they have been found to be relatively sensitive to extraneous shocks and vibrations. Such extraneous vibrations have a tendency to set up spurious vibrations in the instrument which produce erroneous readings. The present invention is directed to improved gyroscope apparatus and system of the vibratory type but which does not suffer from the inherent drawbacks of the prior art vibratory instruments.

In a specific illustrative embodiment of this invention, a tine gyroscope is provided having a number of tines. The instrument is designed so that every motion of a tine at one end of the gyroscope is counter-balanced by the motion of another tine at the other end of the gyroscope. A multi-tine structure of the gyroscope is supported at a center mount which is a true nodal point for supporting the gyroscope without loss of energy. Four tines extend from the center mount in one direction and four tines extend from the center mount in an opposite direction. The motion of each tine is, accordingly, balanced by an equal and opposite motion of a tine at the opposite end of the unit. Further, at the same end of the unit the motion of each tine is balanced by an equal and opposite motion of another tine at the same end of the unit.

The tines themselves are made of a magnetic material and magnetic transducer means are positioned between adjacent tines at each end of the tuning fork structure for sensing the motion of or for driving the adjacent tines. Each tine is rectangularly shaped to provide for a different resonant frequency in the input direction and a different resonant frequency in the output direction. The input frequency is designed to be somewhat higher than the upper limit of typical airframe vibrations encountered, and the output frequency is higher than the input frequency to prevent crosstalk therebetween. The sensitivity of the instrument relates directly to the input frequency so that as large as input frequency as posisble while still providing an adequate output amplitude is utilized.

In addition to the eight tines which extend from and are integral with the central support, two support members extend in opposite directions, from the central support. These two support members extend at the center of each of the two oppositely extending groups of tines, and function to support the magnetic transducing means between the tines.

Features of this invention relate to the provision of a tine structure made of a low loss magnetic material. Various magnetic circuits for sensing the motion of the tines and for driving or damping the tines are isolated from each. The isolation is achieved in part utilizing two windings for each pick-up or sensing function between each pair of tines. The pair of windings develop a closed magnetic circuit through the pair of tines which is not inductively coupled to any other magnetic circuit through the structure.

The windings for sensing particular vibrations are serially connected, and the windings for providing or damping particular vibrations are serially connected both to cancel crosstalk or inductive coupling and to develop a relatively large signal to noise ratio.

Further advantages and features of this invention will become apparent upon consideration of the following description when read in conjunction with the drawing wherein:

FIGURE 1 is a perspective view of the main structural components of the vibratory rate gyro of this invention;

FIGURE 2 is a sectional view of the vibratory rate gyro of this invention taken along lines 2—2 in FIGURE 1;

FIGURE 3 is a sectional view of the vibratory rate gyro of this invention taken along lines 3—3 of FIGURE 1;

FIGURE 4 is a partially functional and partially circuit representation of the vibratory rate gyro of this invention; and FIGURE 5 is a diagrammatic representation of the motion of the tines at one end of the vibratory rate gyroscope of this invention with zero input rotation and then with an effective input rotation.

Referring to FIGURES 1 through 3, a tine structure 10 is depicted which is the main mechanical component of the vibrating tine gyroscope of this invention. The structure 10 is mounted by means of two support tabs 12 and 13 to a support structure, not shown. A central or node portion 11 of the structure 10 forms a rigid support for eight vibratory tines 21 through 24 and 21' through 24' which extend in opposite directions from the central portion 11. Four rectangular shaped tines 21 through 24 extend in one direction along an X axis of the structure 10 and four rectangular tines 21' through 24' extend in the opposite direction. The structure 10 is symmetrical with respect to a plane including the Y and Z axes which are transverse to the X axis. The structure 10 is also symmetrical with respect to the plane of the X and Z axes and with respect to the plane of the X and Y axes.

In addition to the eight tines 21 through 24 and 21' through 24', two central supports 29 and 29' extend in opposite directions from the central portion 11. The central supports 29 and 29' extend in opposite directions along the X axis. The support 29 is, accordingly, centrally located with respect to the four tines 21 through 24, and the support 29' is centrally located with respect to the four tines 21' through 24'.

The central supports 29 and 29', the eight tines 21 through 24 and 21' through 24' and the central portion 11 may all be part of a single metallic member. The two support tabs 12 and 13 may be made of cold roll steel brazed onto the central portion 11. The central portion 11, the eight tines and the central supports 29 and 29' may be made of a low loss magnetic material such as a constant modulus nickel-iron alloy. For example, the nickel alloy designated Iso Elastic, manufactured by the Carpenter Company of Reading, Pennsylvania, may be utilized. This alloy includes approximately 37% by weight of nickel, 7% by weight of chromium, 1% by weight of carbon, with the balance being essentially iron. The modulus of elasticity of the alloy is substantially constant with changes of temperature.

As is hereinafter described, a number of magnetic assemblies 31 to 34 and 31' to 34' are associated with various tines of the structure 10, and the structure 10 together with the assemblies are enclosed in a magnetic shield, not shown. The shield may be a can or other enclosure made of mild-steel or mu-metal to provide for the magnetic isolation. The nickel alloy is magnetic, as indicated above, so that the tines may be readily driven and the motion of the tines may be readily sensed by magnetic transducing means. The present invention is not restricted to the use of the nickel alloy as any spring metal which is magnetic may be utilized. The material may be a low loss magnetic material because as is hereinafter described the different magnetic circuits through the structure 10 do not interfere with each other and are effectively isolated.

The central support 29 supports the four coil assemblies 31 through 34 which fit between the four tines 21 through 24 as depicted in FIGURES 1 through 3. Similarly, the central support 29' supports four coil assemblies 31' through 34' which fit between the four tines 21' through 24'. More specifically, the coil assembly 31 is between the two tines 21 and 22; the coil assembly 32 is between the two tines 22 and 23; the coil assembly 33 is between the two tines 23 and 24; and the coil assembly 34 is between the two tines 21 and 24. The four coil assemblies 31' through 34' are similarly positioned with respect to the associated tines 21' through 24'.

Each of the eight coil assemblies, four on each side, include four windings, as illustrated particularly in FIGURE 3. The coil assembly 31 includes the four windings or magnetic transducers 49 through 52; the coil assembly 32 includes the four windings 69 through 72; the coil assembly 33 includes the four windings 59 through 62; and the coil assembly 34 includes the four windings 39 through 42. Similar designations, which are primed, are utilized for the symmetrical components at the other side of the tine structure 10. For example, the coil assembly 31' includes four windings 49' through 52'.

Each of the four windings in each of the coil assemblies 31 through 34 and 31' through 34' is wound about a permanent magnet which may, illustratively, be cast of Alnico 2. With four windings in each coil assembly, the tine structure 10 includes a total of 32 windings, 16 at each end. The four windings in each of the eight coil assemblies are cast in a plastic material which encloses them and forms the body of the coil assembly. As shown in FIGURE 1, only four leads 90 or 90' extend from each of the eight coil assemblies. Only four leads are provided because as is hereinafter further described, each pair of windings in an assembly are connected in series in the assembly.

The wire forming each of the windings of the assemblies 31 through 34 and 31' through 34' may be copper wire insulated with a material such as Formex. The plastic material forming the coil assemblies may be a non-conductive non-ferric alkyd resin.

Before proceeding with the operation of the tine structure 10, illustrative dimensions of the eight tines are described. The tine structure may have an overall length of slightly less than 4½ inches. The length of each of the tines may illustratively be 1¾ inches. The cross section of each of the tines may be ¼ inch by 3⁄10 inch. As is further hereinafter described, the thickness and length of the tines govern its resonant frequency of vibration. With a tine being rectangular in cross section, as opposed to having a square cross section, it has different resonant frequencies in the two orthogonal directions. Illustratively, the particular given dimensions for a tine structure 10 made of the nickel alloy provide the two different resonant frequencies of 3 kc. and 2.5 kc. The overall width of the tine structure may be 1⅛ inches and its height, not including the support tabs 12 and 13, may be 1 inch. The width is somewhat larger than the height of the structure 10 because of the rectangular (non-square) shape of the tines. The tine structure 10 can be machined out of a single piece or block of the magnetic material. Each end of the tine structure 10 can be separately tuned with the tines at the opposite end being locked in position or blocked. Both from a standpoint of fabrication and adjustment, the tine structure 10 is, accordingly, quite practical.

The axes of the tine structure 10 are defined as follows: the Y axis is the spin axis; the Z axis is the precession axis; and the X axis is the input axis. The tines 21 and 22 are vibrated by the coil assembly 31 in the manner of a tuning fork and, similarly, the tines 23 and 24 are vibrated in the manner of a tuning fork by the coil assembly 33. As illustrated by the solid arrows 121 through 124 in FIGURES 2 and 5, the tines 21 and 22 are vibrated toward each other at the same time that the tines 23 and 24 are vibrated away from each other. The frequency of the vibration is the same but the two pairs of tines are vibrated out-of-phase with each other. The tines 21' through 24' vibrate in phase with their similarly designated tines (unprimed) at the opposite end of the tine structure 10. For example, the tine 21', which is axially opposed along the X axis to the tine 21, is vibrated in phase with the tine 21. The tines 21, 22, 21' and 22', accordingly, move toward each other at the same time that the tines 23, 24, 23' and 24' move away from each other.

In the absence of an input rotation about the X axis, the above described vibratory motion is the only motion which takes place in the tine structure 10. Assuming the Y axis is vertical and the X and Z axes are horizontal for the moment, each of the tines, accordingly, vibrates horizontally without any vertical component in the absence of an input rotation or rate about the X axis. The resonant frequency of the tines in this direction and the frequency at which they are driven may be 2500 cycles per second.

The motion of each of the tines is balanced by an equal and opposite motion of a tine at the opposite end of the structure 10. Forces introduced to the central support 11 by any tine, are accordingly counter-balanced by equal and opposite forces introduced by the oppositely associated tine. Moreover, at each end of the tine structure 10, the force introduced to the central portion 11 by one pair of tines is counter-balanced by the opposite forces introduced by the other pair of tines. For example, when the tines 21 and 22 move toward each other, they tend to introduce a force toward the central portion 11, and as the tines 23 and 24 move apart, they tend to introduce an opposite force with respect to the central portion 11. Due to the fact that the two pairs of tines extend from different parts of the central portion 11, a residual force, or amount of energy, is introduced to the central portion 11 due to the operation of the tines at one end of the structure 10. The symmetrical arrangement provided with tines at both ends of the structure 10 balances out this residual force. As is hereinafter described, the utilization of the symmetrical arrangement also permits the provision of a number of windings for each of the driving and sensing functions so that greater forces may be developed to drive the tines and greater signals may be generated by the vibratory motion of the tines.

Reference is now made to FIGURE 4 which illustrates a typical control and utilization system for the instrument, including the tine structure 10 depicted in FIGURES 1 through 3. Eight windings (51, 52, 61, 62, 51', 52', 61' and 62') which are serially connected are utilized to respectively drive the tines 21 through 24 and 21' through 24' in the manner depicted above. The windings 51 and 52 of the coil assembly 31 are utilized to vibrate the two tines 21 and 22 back and forth; the windings 61 and 62 of the coil assembly 33 are utilized to vibrate the two tines 23 and 24 back and forth; the windings 51' and 52' of the coil assembly 31' are utilized to vibrate the two tines 21' and 22' back and forth; and the two windings 61' and 62' of the coil assembly 33' are utilized to vibrate the two tines 23' and 24' back and forth. Similarly, the eight windings 49, 50, 49', 50', 59, 60, 59' and 60' are serially connected to function as an oscillator pickup or sensor.

Each of the windings in each of the eight coil assemblies is wound about a permanent magnet, as indicated above. Referring to FIGURE 3, which depicts the permanent magnets in the windings, the adjacent magnets are oppositely aligned. For example, the magnet enclosed by the windings 39, has its north pole adjacent the tine 21, whereas the magnet enclosed by the winding 40 has its south pole adjacent to the tine 21, etc. Further, the winding direction of the adjacent windings in each coil assembly are in opposite directions. In this manner, current serially provided through the two windings 51 and 52, by way of illustration, to drive the tines 21 and 24, develops aiding magnetic flux. The winding direction is in opposite directions for the successive windings in order to provide for the addition of the effects of adjacent windings. The drive windings 51 and 52 are positioned toward the central portion 11 of the tine structure 10 whereas the sensing windings 49 and 50 are positioned toward the outer ends of the tines 21 and 22. As the tines are vibrated, by the windings 51 and 52, the vibratory motion is sensed by the windings 49 and 50. The movement of the tines 21 and 22 adjacent the windings 49 and 50 is somewhat greater than their movement adjacent the windings 51 and 52 because the ends of the tines 21 and 22 move through a greater arc than do their portions adjacent the central portion 11.

Two pickup windings and two drive windings are provided between each pair of tines (21—22, 23—24, etc.) instead of just one winding to cancel inductive coupling therebetween. The pair of windings 51 and 52, illustratively, which are positioned between the two tines 21 and 22, develop a closed magnetic circuit from the winding 51 across the air gap to the tine 22, through a portion of the tine 22, across the air gap to the winding 52 in the coil assembly 31, through the permanent magnet in the winding 52, across the air gap to the tine 21, through a portion of the tine 21 and across the air gap to the magnet in the winding 51. The winding 51 provides flux in one direction between the tines 21 and 22 and the winding 52 provides flux in the opposite direction so that they aid each other in developing the closed magnetic circuit. None of the flux in this magnetic circuit is provided to any other magnetic circuit through the tine structure 10. Specifically, there is no inductive or magnetic coupling between the torquing windings 51 and 52 and the pickup windings 49 and 50 which are also positioned between the tines 21 and 22. As is hereinafter described, a number of other magnetic circuits developed by the coil assemblies 32, 34, 32' and 34' are generated for rate of turn sensing and for damping functions. Though these magnetic circuits are also through the tines 21—24 and 21'—24' they do not inductively or magnetically couple to any of the other magnetic circuits. Actually, a total of 16 different magnetic circuits may be simultaneously present through the tine structure 10; 8 at each end. The elongate tines and the two-winding arrangement between pairs of tines for each function, however, serve to isolate the magnetic circuits.

In the system illustrated in FIGURE 4, the output signal from the eight serially connected pickup windings 49, 50, 59, 60, 49', 50', 59' and 60' is introduced to an amplifier 100 which drives the eight serially connected drive windings 51, 52, 61, 62, 51', 52', 61' and 62'. The signal introduced to the drive windings is at the proper frequency to sustain oscillation in the tine structure 10 at the resonant frequency of the tines in a plane parallel to XZ plane. As indicated above, this resonant frequency may be 2.5 kilocycles per second as contrasted with a resonant frequency of 3 kilocycles per second. An amplitude control circuit 101 is associated with the amplifier 100 to control the gain of the amplifier 100.

In addition to the eight driving windings (51, 52, 61, 62, 51', 52', 61' and 62') and the eight pickup windings (59, 60, 49, 50, 59', 60', 49' and 50') mentioned above, the system also includes eight rate pickup windings and eight rate torquing windings which respectively form part of the assemblies 32, 34, 32' and 34'. The eight pickup windings are the windings 39, 40, 69, 70, 39', 40', 69' and 70' and the eight rate torquing windings are the windings 41, 42, 71, 72, 41', 42', 71' and 72'. These windings each enclose magnets and are serially connected in a manner similar to that of the respective pickup and drive windings. The rate pickup windings sense any motion toward and away from the XZ plane or in a direction parallel to the Y axis. Actually, the rate pickup windings sense any differential motion between pairs of tines 21—24, 22—23, etc. Without any input rotation about the X axis, the tines 21 and 22 only vibrate toward each other so that a differential component towards and away from the tines 24 and 23 does not appear. Similarly, the tines 23 and 24 only vibrate toward and away from each other in the absence of an input rotation about the X axis. The rate pickup windings only sense a differential movement between the two associated tines. For example, the windings 39 and 40 sense only differential movements between the tines 21 and 24. If the two tines 21 and 24 move downward together, the reluctance of the magnetic circuit through the magnets of the windings 39 and 40 remains the same because as one pair of air gaps increase, the other pair of air gaps decrease. A differential motion between the tines 21 and 24 changes the reluctance of the magnetic circuit so that a varying amount of flux passes through the windings 39 and 40 to induce a correspondingly varying potential across the windings 39 and 40.

Any external shocks tend to cause similar movements of the tines at the same end of the structure 10. The shocks accordingly do not introduce any inaccuracies because they do not cause any differential motion between pairs of associated tines.

Assuming now a rotation of the tine structure 10 about the X axis, the gyroscopic forces set up by the rotation cause the tines to precess in a manner depicted by curves 221—224 in FIGURE 5. The precession causes the tines 21 and 24 to vibrate toward and away from each other at a frequency determined by the tine dimensions. As indicated above, when an input rotation is provided, the tines 21 and 24 vibrate toward and away from each other, and, similarly, the tines 22 and 23 vibrate toward and away from each other. The amplitude of the vibratory motion due to the input rotation is an indication of the magnitude of the rate of turn. Though the tines are tuned to a resonance of 3,000 cycles per second, they are precessed back and forth at the input drive frequency of 2,500 cycles per second. The tines are tuned to a resonant vibratory frequency of 3,000 cycles per second in the Y axis direction to prevent crosstalk vibration due to the 2,500 cycle drive vibration. When the input rotation about the X axis is zero, there should not be any differential vibration along the Y axis direction.

In FIGURE 5, curves 221 through 224 illustrate the movement of the points at the ends of the tines 21 through 24. The ends of the tines effectively follow an elliptical path with the length of the minor axis of each ellipse being proportional to the rate of the turn of the structure 10 about the X axis. The direction of rotation of the ends of the tines 21 through 24 depends upon the direction of the input rotation about the X axis. If the input direction of rotation is reversed, the direction of rotation of the ends of the tines 21 through 24 reverses. The tines 21' through 24' at the other end of the structure 10, of course, vibrate in exactly the same manner.

The amplitude of the alternating voltage output signal developed across the rate pickup windings, accordingly, depends upon the components or vibrational motion of the tines 21 through 24 along the direction of the Y axis. That is the differential movement of the tines 21 through 24 and the differential movement between the tines 22 and 23. The amplitude of the signal is a measure of the rate of turn of the apparatus about the X axis and the phase of the output signal is determined by the direction of turn of the apparatus about the X axis.

In the system shown in FIGURE 4, the rate signals from the serially connected rate pickup windings are provided to an amplifier 105, and to a frequency discriminator 106. As is hereinafter described, the amplified rate signals from the amplifier 105 are utilized to obtain a measurement of the rate of turn of the structure 10 about the X axis. The rate signals are utilized at the discriminator 106 for developing damping signals which are provided to the rate torquing windings 41, 42, 41', 42', 71, 72, 71' and 72' to inhibit undesired mechanical oscillations or vibrations of the tines. The pickup windings 39, 40, 39', 40', 69, 70, 69' and 70' are serially connected to an input terminal of a frequency discriminator 106 and the output terminal of the discriminator 106 is coupled by means of an amplifier 107 to the torquing or damping windings. The frequency discriminator 106 is constructed in accordance with well known principles to be selective to the 3,000 cycles per second resonance but to be unresponsive to the signal frequency of 2,500 cycles per second corresponding to the frequency at which the tines are vibrated in the Z axis direction. Spurious vibrations in an undamped tine can cause relative large amplitude deflections at the resonant frequency, due to high values of Q at resonance.

Therefore, any output signals that might be developed by the pickup windings in response to spurious vibrations (not 2,500 cycles per second) of the tines in the direction of the Y axis are fed through the amplifier 107 to the torquing or damping windings. The latter windings produce out-of-phase vibrations of the tines so that such spurious vibrations of the tines may be effectively damped. This selective damping of the tines is advantageous in that undesirable resonances are eliminated and the effect of shock and vibration is minimized. The resonant frequency of the tines in a direction of the Y axis, as indicated above, is 3,000 cycles per second.

As described above, the rate pickup windings are coupled to the amplifier 105 as well as to the frequency discriminator 106. The amplifier 105 may be a tuned amplifier which passes only frequencies approximately 2,500 cycles per second. The amplified rate signal from the amplifier 105 is introduced to a demodulator 110 which provides an indication of the rate of turn of the tine structure 10 about its X axis. More specifically, the amplifier 105 is connected to the control grids of two triodes 146 and 147 in the demodulator 110. The cathodes of these triodes are connected to ground and their anodes are connected respectively through resistors 141 and 142 to the opposite terminals of a secondary winding of a transformer 140. The triodes 146 and 147 together with the transformer 140 are connected as a phase sensitive amplifier for demodulating the rate signals. The primary windings of the transformer 140 receives a reference signal from a reference amplifier 103 in turn driven from the amplifier 100 described above. The signal to the transformer 140 is, accordingly, the same 2,500 cycle per second drive frequency supplied to the drive windings 51, 52, 61, 62, 51', 52', 61' and 62'.

The two anodes of the triodes 146 and 147 are interconnected by a zero center milliammeter 145 which provides an indication of the rate signal. The two signals, one from the reference amplifier 103 and the other from the amplifier 105, both are of the same frequency (2,500 cycles per second). The frequency from the reference amplifier 103 is out-of-phase with the signal developed by the vibratory pickup windings 49, 50, 59, 60, 49', 50', 59' and 60' and it has a constant amplitude. The signal from the amplifier 105, on the other hand, has a phase depending upon the direction of the rate of turn about the X axis of the structure 10 and an amplitude proportional to the rate of turn of the structure 10 about its X axis.

When the turn of the structure 10 about its X axis is in a first direction, the phase relation between the rate signal from the amplifier 105 and the signal from the amplifier 103 is such that one of the triodes 146 and 147 is conductive and the other is non-conductive. The meter 145, therefore, provides a reading on one side of its center position which is proportional to the amplitude of the signal from the amplifier 105. This reading represents the rate of turn of the structure 10 about the X axis in the first direction. The meter 145 can be calibrated to directly read the rate of turn.

Alternately, when the structure 10 is turned in a second direction opposite to the first direction, the phase relation between the rate signal from the amplifier 105 and the signal from the amplifier 103 is reversed. Therefore, the conductivity of the triodes 146 and 147 is reversed so that the meter 145 is deflected to its other side of its zero center point. The meter 145, accordingly, may be calibrated to indicate the rate of turn and the direction of the turn is indicated by the deflection of the meter with respect to its zero center point. When there is no turn, or input rotation, it is apparent that the meter 145 will be pointing to its central zero position.

Any motion of the supports 29 and 29' of the tine structure 10 do not introduce any inaccuracies to the rate signals. First, the supports 29 and 29' have larger cross sectional dimensions and, accordingly, have resonant frequencies higher than either of the resonant frequencies of the tines 21 through 24 and 21' through 24'. Further, the vibration of the tines 21 through 24 and 21' through 24' even if they contact the coil assemblies do not introduce material forces to the structures 29 and 29' because the forces counter-balance each other. Moreover, even if the supports 29 and 29' do move or vibrate their motion does not affect the operation of the tine gyroscope. The reason for this effect is that the movement of the supports 29 and 29' corresponds to an in phase movement of a pair of tines: the net air gap remains the same. Since any movement of the structures 29 and 29' does not affect the net air gap in any of the magnetic circuits through the tine structure 10, it does not introduce any noise or distortion to the rate signal.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. An inertial angular velocity sensing instrument, including, a vibratory member having a central portion and a plurality of tines symmetrically disposed with respect to said central portion, electromagnetic means positioned between pairs of adjacent tines for setting the tines in each pair in vibration toward and away from each other in a particular phase relationship to obtain a cancellation of shock forces applied to the sensing instrument, electromagnetic means positioned between the tines in different adjacent pairs for sensing any relative motion of the tines in the different adjacent pairs toward and away from each other to obtain a cancellation of the effects of shock on the sensing instrument and to obtain a sensing of the angular velocity of the sensing instrument, and means for rigidly securing said vibratory member at said central portion.

2. An inertial angular velocity sensing instrument in accordance with claim 1 wherein the plurality of tines in the vibratory member include four tines extending in a first direction from the central portion of the vibratory member and four additional tines extending in a second direction opposite to that of the first direction from the central portion.

3. An inertial angular velocity sensing instrument, including, a vibratory member made of magnetic material and having a hub portion and a plurality of tines extending in the same direction in parallel with each other from said hub portion, first electromagnetic means positioned between first and second ones of said plurality of tines for vibrating said first and said second tines toward and away from each other at a particular frequency, second electromagnetic means positioned between third and fourth ones of said plurality of tines for vibrating said third and said fourth tines toward and away from each other at the particular frequency and in a particular phase relationship to the vibratory motions of said first and second tines to cancel any residual force in the vibratory member resulting from the vibratory motions of the first and second tines, and third electromagnetic means positioned between said second and said third tines for sensing any relative vibratory motion between said second and said third tines toward and away from each other.

4. An intertial angular velocity sensing instrument, including, a vibratory member made of magnetic material and having a hub portion and a plurality of tines extending in the same direction in parallel with each other from said hub portion, first electromagnetic means positioned between first and second ones of said plurality of tines for vibrating said first and second tines toward and away from each other at a particular frequency, second electromagnetic means positioned between third and fourth ones of said plurality of tines for vibrating said third and said fourth tines toward and away from each other at the particular frequency but out-of-phase with respect to the vibrations of said first and said second tines toward and away from each other to obtain a cancellation of any residual force in the vibratory member, and third electromagnetic means positioned between said second and said third tines for sensing any vibratory motion between said second and said third tines toward and away from each other, said second and said third tines having a resonant frequency toward and away from each other which is different than the particular frequency.

5. An inertial angular velocity sensing instrument referable to three orthogonal axes, X, Y and Z, and adapted for measuring rate of turn about the X axis, including, a tine structure made of magnetic material and having a rigid central portion and a plurality of vibratile tines extending from said central portion in opposite directions parallel to the X axis; electromagnetic driving means mounted on said central portion of said tine structure and magnetically coupled to said vibratile tines for vibrating all of said tines at the same frequency but first particular ones in one phase and second particular ones in the opposite phase to obtain a cancellation of any residual force on the sensing instrument, said tines being vibrated toward and away from each other in a plane defined by the X and Z axes; electromagnetic pick-up means mounted on said central portion of said tine structure and magnetically coupled to said vibratile tines for providing an indication of the relative vibration of said tines towards and away from each other in a plane defined by the X and Y axes; and means coupled to said pick-up means for utilizing the indication therefrom to provide an indication of the rate of turn of the tine structure about the X axis.

6. An inertial angular velocity sensing instrument, including, a member made of magnetic material and having a rigid central portion, and a plurality of vibratory tines extending from said central portion and vibrant at a particular resonant frequency in a first direction, magnetic transducing means positioned between particular ones of said tines for vibrating said tines at the particular resonant frequency of said tines in the first direction, said tines having a different resonant frequency from the particular resonant frequency in a direction perpendicular to the direction of vibration of the tines by said transducing means, magnetic damping means positioned between some of said tines and responsive to vibrations of said tines at the different resonant frequency in the perpendicular direction and operatively coupled to said tines for operating upon said tines to suppress the vibration of said tines in said perpendicular direction at said different resonant frequency, and magnetic pick-up means positioned between some of said tines for providing an indication of the vibratory motion of said tines in said perpendicular direction at the particular resonant frequency.

7. An inertial angular velocity sensing instrument, including, a vibratory member having a central portion and a plurality of tines symmetrically disposed with respect to said central portion, electromagnetic means positioned between first pairs of adjacent tines in the plurality for setting the tines in each pair in vibration toward and away from each other in a first direction at a particular frequency, electromagnetic means positioned between the tines in different adjacent pairs in the plurality for sensing any relative motion of the tines in the different adjacent pairs toward and away from each other at the particular frequency in a second direction transverse to the first direction, means for rigidly securing said vibratory member at said central portion, said plurality of tines in vibratory member including a first group of tines extending from the central portion of the vibratory member in a third direction transverse to the first and second directions and including a second group of tines extending in a direction opposite to that of the first group of tines, each of said tines in said first and second groups having a cross-sectional shape where adjacent sides of said shape are unequal in length to provide different resonant frequencies in the first and second directions, and means responsive to vibrations of the tines in the first and second groups in the second direction at the resonant frequency of the tines in the second direction for operating upon the tines to damp the vibratory movements of the tines in the second direction at the resonant frequency of the tines in that direction.

8. An inertial angular velocity sensing instrument, including, a vibratory member having a central portion and a plurality of tines symmetrically disposed with respect to said central portion, electromagnetic means positioned between first particular pairs of adjacent tines in the plurality for setting the tines in each pair in vibration toward and away from each other at a particular frequency in a first direction, electromagnetic means positioned between the tines in second particular pairs in the plurality for sensing any relative motion of the tines in the second particular pairs toward and away from each other at the particular frequency in a second direction transverse to the first direction, means for rigidly securing said vibratory member at said central portion, said plurality of tines in the vibratory member including a first group of tines extending from the central portion of the vibratory member in a third direction transverse to the first and second directions and including a second group of tines extending in a direction opposite to that of the first group of tines at positions relative to the central portion corresponding to the tines in the first group, said first and said second mentioned electromagnetic means each including at least one winding, circuit means selectively interconnecting the windings associated with said first group of tines with the windings associated with said second group of tines to obtain in-phase vibratory motions in the first direction of corresponding tines in the first and second groups and out-of-phase vibratory motions of the tines in particular ones of the first particular pairs relative to the tines in other ones of the first particular pairs so as to obtain a cancellation of any residual forces in the sensing instrument as a result of the vibrations of the tines in the first direction.

9. An inertial angular velocity sensing instrument, including, a vibratory member having a central portion and a plurality of tines symmetrically disposed with respect to said central portion, first electromagnetic means positioned between first pairs of adjacent tines in the plurality for setting the tines in each pair in vibration toward and away from each other in a first direction at a first particular frequency, second electromagnetic means positioned between the tines in second adjacent pairs different from the first adjacent pairs for sensing any relative motion of the tines in the different adjacent pairs toward and away from each other in a second direction transverse to the first direction, and means for rigidly securing said vibratory member at said central portion, said first electromagnetic means including first pair of winding with each pair being connected in an electrical circuit to provide for a closed magnetic circuit through the windings in the pair and adjacent portions of the respective one of the first pairs of adjacent tines, said second electromagnetic means also including second pairs of windings with each pair being connected in an electrical circuit to provide for a closed magnetic circuit through the windings in the pair and adjacent portions of the respective pair of adjacent tines.

10. An inertial angular velocity sensing instrument, including, a vibratory member having a central portion and a plurality of tines symmetrically disposed with respect to said central portion, first electromagnetic means positioned between first pairs of adjacent tines in the plurality for setting the tines in each pair in vibration toward and away from each other in a first direction at a first particular frequency, second electromagnetic means positioned between the tines in second adjacent pairs different from the first pairs for sensing any relative motion of the tines in the second adjacent pairs toward and away from each other at the first particular frequency in a second direction transverse to the first direction where the second pairs of tines are formed from the same tines as the first pairs of tines, means for rigidly securing said vibratory member at said central portion, said plurality of tines in said vibratory member including a first group of tines extending from the central portion of the vibratory member in a third direction transverse to the first and second directions and further including a second group of tines extending in a direction opposite to that of the first group of tines, said first and said second electromagnetic means respectively including first and second pluralities of windings where each of the windings in the first plurality is respectively associated with a different one of the first pairs of tines and where each of the windings in the second plurality is respectively associated with a different one of the second pair of times, first circuit means serially and selectively interconnecting the first plurality of windings associated with the first groups of tines, means for serially and selectively interconnecting the second plurality of windings associated with the second groups of tines, each of said tines in the first and second groups having a cross-sectional shape where adjacent sides of said shape are unequal in length to provide for a resonant frequency of the tines in the second direction different from the first particular frequency, and means associated with the second electromagnetic means for providing output indications only in accordance with the relative movements of the tines in the second pairs in the second direction at the first particular frequency.

11. An inertial angular velocity sensing instrument including, a vibratory member made of magnetic material and having a hub portion and a plurality of tines extending in the same direction in parallel with each other from said hub portion, first electromagnetic means positioned between a first pair of said plurality of tines for vibrating said first pair of tines toward and away from each other at a particular frequency in a first direction, second electromagnetic means positioned between a second pair of said plurality of tines for vibrating said second pair of tines toward and away from each other at the particular frequency in the first direction and in a particular phase relationship with respect to the first pair of tines to minimize any residual force on the sensing instrument, and third electromagnetic means positioned between the tines in the first and second pairs for sensing any relative vibratory motion between said tines in said first and second pairs toward and away from each other in a second direction transverse to the first direction, each of the tines in the first and second pairs having a first dimension in the first direction and having a second dimension different from the first dimension in the second direction to produce a resonant frequency of the tines in the second direction different from the particular frequency, and means responsive to the signals from the third electromagnetic means for passing only the signals at the particular frequency.

12. An inertial angular velocity sensing instrument, including, a member made of magnetic material and having a rigid central portion, and a plurality of vibratory tines extending from said central portion and having a first particular resonant frequency in a first direction, magnetic transducing means positioned between first particular pairs of said tines for vibrating said tines at the first particular frequency of said tines in the first direction, said tines having a different resonant frequency in a second direction substantially perpendicular to the first direction, said transducing means including pairs of windings connected in a first electrical circuit and disposed relative to the first particular pairs of the tines for generating a closed magnetic circuit through the pair of windings and such pairs of the tines, magnetic damping means positioned between second particular pairs of said tines and responsive to the vibrations of said tines in the second direction at said different resonant frequency for producing a vibratory force upon said tines in an opposed phase relationship to such vibrations of the tines to suppress the vibration of said tines in said second direction at said different resonant frequency, the second pairs of tines being formed from different combinations of the tines in the first pairs, said damping means including pairs of windings connected in a second electrical circuit and disposed relative to the second pairs of tines for generating a closed magnetic circuit through the pairs of windings of said damping means and the second pairs of tines to produce the vibratory opposing force at the different resonant frequency, and magnetic pick-up means positioned between the second pairs of tines for providing an indication of the motion of said tines in said second direction at the first particular frequency, said magnetic pick-up means including pairs of windings connected in a third electrical circuit and disposed relative to the second pairs of tines for generating a closed magnetic circuit through the pairs of windings of said magnetic pick-up means and through the second pairs of tines.

13. An inertial angular velocity sensing instrument, including, a vibratory member having a central portion and a plurality of tines extending from said central portion and symmetrically disposed with respect to said central portion, first electromagnetic means positioned between first pairs of adjacent tines in the plurality for setting the tines in each pair in vibration toward and away from each other at a particular frequency in a first direction, second electromagnetic means positioned between the tines in second adjacent pairs for sensing any relative motion of the tines in the different adjacent pairs toward and away from each other at the particular frequency in a second direction transverse to the first direction for the minimizing of any effects of shock on the sensing instrument in the second direction, the second pairs of tines being different from the first pairs of tines but including the tines from the first pairs, means for rigidly securing said vibratory member at said central portion, and means coupled to the first and second electromagnetic means for producing output signals having characteristics representing the direction and magnitude of the angular velocity in accordance with the relative characteristics of the signals from the first and second electromagnetic means.

14. An inertial angular velocity sensing instrument, including, a vibratory member having a central portion and a plurality of tines symmetrically disposed with respect to said central portion, first electromagnetic means positioned between first pairs of adjacent tines in the plurality for setting the tines in each pair in vibration toward and away from each other in a first direction at a first particular frequency, second electromagnetic means positioned between the tines in second adjacent pairs different from the first adjacent pairs for sensing any relative motion of the tines in the different adjacent pairs toward and away from each other at the first particular frequency in a second direction transverse to the first direction where the tines in each of the second pairs are formed from the tines in the first pairs, said second electromagnetic means being positioned between the tines in the second adjacent pairs at positions further from said central portion than the positions of said first electromagnetic means, means magnetically coupled to said first and second electromagnetic and responsive only to signals at the first particular frequency for combining the signals from the first and second electromagnetic means in a particular relationship to produce output signals having a phase representing the direction of angular velocity of the sensing instrument and having an amplitude representing the magnitude of such angular velocity, and means responsive to vibrations of said tines in the second direction at frequencies different from said first particular frequency for introducing a force to said tines to damp the vibrations of the tines in the second direction at such different frequencies.

15. An inertial angular velocity sensing instrument, including, a vibratory member made of magnetic material and having a hub portion and a first group of tines extending from said hub portion in a first direction and a second group of tines extending from said hub portion in a second direction opposite to the first direction and at positions corresponding to the tines in the first group, first electromagnetic means positioned between first and second tines in said first group and first and second tines in said second group for vibrating said first and said second tines in said first group toward and away from each other at a first particular frequency and said first and second tines in said second group toward and away from each other at the first particular frequency and in phase relationship with the vibratory movements of the first and second tines in the first group, second electromagnetic means positioned between third and fourth ones of said tines in said first group and between third and fourth ones of said tines in said second group for vibrating said third and said fourth tines in each of said first and second groups toward and away from each other at the particular frequency but out-of-phase with respect to the vibration of said first and said second tines toward and away from each other in each of said first and second groups to minimize any residual forces on the vibratory member, third electromagnetic means positioned between said second and said third tines in said first group and between said second and said third tines in said second group for sensing any relative vibratory motion between said second and said third tines in each group toward and away from each other at the first particular frequency in a second direction transverse to the first direction, said second and said third tines in each of said first and second groups having a second resonant frequency toward and away from each other in the second direction where the second resonant frequency is different than the first particular frequency, circuit means connecting said first and said second electromagnetic means of said first and second groups to provide for the synchronous vibration of the first and second tines in the first and second groups and the synchronous vibration of the third and fourth tines in the first and second groups in opposed phase to the vibrations of the first and second tines in the first and second groups, means operatively connected to said circuit means and said third electromagnetic means for combining the signals at the first particular frequency from said circuit means and said third electromagnetic means to produce signals having a phase indicative of the direction of angular velocity of the sensing instrument and having an amplitude indicative of the amplitude of angular velocity of the sensing instrument, and means responsive to the signals at the second resonant frequency from the third electromagnetic means for operating upon the tines in the first and second groups to dampen any vibratory movements of the tines at the second frequency in the second direction.

16. An inertial angular velocity sensing instrument in accordance with claim 15 wherein each of the tines in each of the first and second groups has a rectangular cross-section with a first orthogonal dimension in the first direction and with a second orthogonal dimension different than the first dimension in the second direction.

17. An inertial angular velocity sensing instrument, including a vibratory member made of magnetic material and having a hub portion and four tines integral with said hub portion and extending in the same direction in parallel with each other from said hub portion, first electromagnetic means positioned between first and second ones of said four tines for vibrating said first and said second tines toward and away from each other in a first direction at a particular frequency, second electromagnetic means positioned between third and fourth ones of said four tines and connected in an electrical circuit with said first electromagnetic means for vibrating said third and said fourth tines toward and away from each other in the first direction at the particular frequency and in a phase relationship opposite to the vibrations of said first and second tines to minimize any residual forces on the hub portion, third electromagnetic means positioned between said second and said third tines for sensing any relative vibratory motion between said second and said third tines toward and away from each other at the particular frequency and in a second direction substantially perpendicular to the first direction, and a support member supporting said first, said second and said third electromagnetic means, said support member having an elongate shape and extending in a direction substantially parallel to the direction that said four tines extend, said support member being centrally located between said four tines and being in turn supported on said hub portion.

18. An inertial angular velocity sensing instrument, including, a vibratory member made of magnetic material and having a hub portion and four tines integral with said hub portion and extending in the same direction in parallel with each other from said hub portion, first electromagnetic means positioned between first and second ones of said four tines for vibrating said first and said second tines toward and away from each other in a first direction at a particular frequency, second electromagnetic means positioned between third and fourth ones of said four tines and connected to an electrical circuit with said first electromagnetic means for vibrating said third and said fourth tines toward and away from each other in the first direction at the particular frequency but out-of-phase with respect to the vibration of said first and said second tines toward and away from each other to cancel any residual forces on the hub member, said first and second tines being disposed in a plane substantially parallel to the plane defined by said third and fourth tines, third electromagnetic means positioned between said second and said third tines for sensing any relative vibratory motion between said second and said third tines toward and away from each other at the particular frequency in a second direction substantially perpendicular to the first direction, said second and said third tines having a different resonant frequency in the second direction than the particular frequency, and a support member supporting said first, said second and said third electromagnetic means, said support member having an elongate shape and extending in a direction substantially parallel to the direction that said four tines extend, said support member being centrally located between said four tines and being integral with said hub portion of said vibratory member.

References Cited in the file of this patent

UNITED STATES PATENTS

| | | |
|---|---|---|
| 2,455,939 | Meredith | Dec. 14, 1948 |
| 2,544,646 | Barnaby et al. | Mar. 13, 1951 |
| 2,594,749 | Ehrat | Apr. 29, 1952 |
| 2,753,173 | Barnaby et al. | July 3, 1956 |
| 2,838,698 | Holt | June 10, 1958 |
| 2,861,256 | Hart | Nov. 18, 1958 |
| 2,974,530 | Jaoven | Mar. 14, 1961 |

FOREIGN PATENTS

| | | |
|---|---|---|
| 1,176,197 | France | Nov. 24, 1958 |